US012312865B2

(12) United States Patent
Garcia et al.

(10) Patent No.: US 12,312,865 B2
(45) Date of Patent: May 27, 2025

(54) INTERLOCKING LADDERS AND COMPONENTS THEREOF

(71) Applicant: Werner Co., Greenville, PA (US)

(72) Inventors: Jesus Miguel Gutierrez Garcia, Cd. Juarez Chihuahua (MX); Slavisa Dacic, Hanover Park, IL (US)

(73) Assignee: Werner Co., Greenville, PA (US)

( * ) Notice: Subject to any disclaimer, the term of this patent is extended or adjusted under 35 U.S.C. 154(b) by 0 days.

(21) Appl. No.: 18/381,913

(22) Filed: Oct. 19, 2023

(65) Prior Publication Data

US 2024/0052702 A1 Feb. 15, 2024

Related U.S. Application Data

(63) Continuation of application No. 16/569,073, filed on Sep. 12, 2019, now Pat. No. 11,834,908.

(51) Int. Cl.

| | |
|---|---|
| ***E06C 7/50*** | (2006.01) |
| ***E06C 1/12*** | (2006.01) |
| ***E06C 7/08*** | (2006.01) |

(52) U.S. Cl.

CPC .................. *E06C 7/50* (2013.01); *E06C 1/12* (2013.01); *E06C 7/08* (2013.01)

(58) Field of Classification Search

CPC ..... E06C 7/50; E06C 7/08; E06C 7/48; E06C 7/46; E06C 1/12; E06C 1/32

See application file for complete search history.

(56) References Cited

U.S. PATENT DOCUMENTS

| | | | |
|---|---|---|---|
| 655,246 | A | 8/1900 | Kingsley |
| 1,241,392 | A | 9/1917 | Edward |
| 1,277,504 | A | 9/1918 | Tanner |
| 1,461,952 | A | 7/1923 | Walchli |
| 1,540,937 | A | 6/1925 | Givens |
| 2,598,278 | A | 5/1952 | Mason |

(Continued)

FOREIGN PATENT DOCUMENTS

| | | | |
|---|---|---|---|
| CN | 113107346 | A | 7/2021 |
| JP | 2014214579 | A | 11/2014 |

OTHER PUBLICATIONS

Canadian Intellectual Property Office, Office Action issued in International Application No. 3,092,856, Jul. 28, 2022, 4 pp.

(Continued)

*Primary Examiner* — Justin B Rephann
(74) *Attorney, Agent, or Firm* — Fitch, Even, Tabin & Flannery LLP

(57) ABSTRACT

In some embodiments, an interlocking ladder includes a first rail and a second rail disposed parallel to and adjacent the first rail, with a guide bracket coupled to the first rail. The guide bracket includes a bracket flange portion coupled to the first rail and hooked portion disposed about the second rail. The hooked portion is cantilevered from the bracket flange portion. The hooked portion includes a first engagement projection and a second engagement projection that extend from an outer surface of the hooked portion. The first engagement projection is spaced from the second engagement projection and defines a slot therebetween. The ladder may further include one or more of an end cap having an engagement portion and a rail shield including an engagement portion.

21 Claims, 14 Drawing Sheets

(56) References Cited

U.S. PATENT DOCUMENTS

| | | | | | |
|---|---|---|---|---|---|
| 2,959,245 | A | | 11/1960 | Thomas | |
| 3,291,258 | A | * | 12/1966 | Twilley | E06C 1/12 182/211 |
| 3,321,042 | A | | 5/1967 | Kocina | |
| 3,337,001 | A | | 8/1967 | Huska | |
| 3,343,630 | A | | 9/1967 | James | |
| 3,347,340 | A | * | 10/1967 | Huska | E06C 1/12 182/207 |
| 3,365,023 | A | | 1/1968 | Nagle | |
| 3,402,788 | A | * | 9/1968 | Redman | E06C 1/12 182/207 |
| 3,454,135 | A | | 7/1969 | Charles | |
| 3,491,853 | A | | 1/1970 | Stillman, Jr. | |
| 3,502,173 | A | | 3/1970 | Arnold | |
| 3,811,151 | A | | 5/1974 | Kuemmerlin | |
| 3,854,185 | A | | 12/1974 | Reid | |
| 3,935,926 | A | | 2/1976 | Butler | |
| 3,997,027 | A | | 12/1976 | Patterson | |
| 4,080,713 | A | | 3/1978 | Reid | |
| 4,256,200 | A | | 3/1981 | Loix | |
| 4,750,587 | A | | 6/1988 | McAllister | |
| 4,802,643 | A | * | 2/1989 | Uys | H02G 3/0456 403/363 |
| 5,156,234 | A | | 10/1992 | McCallum | |
| 5,350,038 | A | | 9/1994 | Lazarus | |
| 5,533,591 | A | | 7/1996 | Kiska | |
| 5,758,745 | A | | 6/1998 | Beggs | |
| 5,950,761 | A | | 9/1999 | Murphy | |
| 6,269,909 | B1 | | 8/2001 | Grimes | |
| 6,422,340 | B1 | | 7/2002 | Grundler | |
| 6,866,117 | B2 | | 3/2005 | Moss | |
| 6,935,464 | B2 | | 8/2005 | Duan | |
| 6,991,063 | B2 | | 1/2006 | Latimer | |
| 7,080,714 | B2 | | 7/2006 | Stout | |
| 7,806,233 | B2 | | 10/2010 | Parker | |
| 8,215,452 | B2 | | 7/2012 | Stewart | |
| 10,689,908 | B2 | | 6/2020 | Mora | |
| 11,142,949 | B2 | | 10/2021 | Leng | |
| 11,346,154 | B2 | | 5/2022 | Major | |
| 11,486,199 | B2 | | 11/2022 | Mora | |
| 11,834,908 | B2 | | 12/2023 | Garcia | |
| 2013/0112501 | A1 | | 5/2013 | Gealy | |
| 2018/0094488 | A1 | | 4/2018 | Major | |
| 2018/0163467 | A1 | | 6/2018 | Parker | |
| 2018/0179820 | A1 | | 6/2018 | Mora | |
| 2019/0136620 | A1 | * | 5/2019 | Leng | E06C 1/125 |
| 2021/0079727 | A1 | | 3/2021 | Garcia | |
| 2021/0198943 | A1 | | 7/2021 | Parker | |
| 2021/0198944 | A1 | | 7/2021 | Pozgay | |
| 2022/0025701 | A1 | | 1/2022 | Scheurich | |
| 2022/0025703 | A1 | | 1/2022 | Barker | |

OTHER PUBLICATIONS

Canadian Intellectual Property Office, Office Action issued in International Application No. 3,092,856, Mar. 9, 2023, 3 pp.

Canadian Intellectual Property Office, Office Action issued in International Application No. 3,092,856, Oct. 29, 2021, 3 pp.

USPTO; U.S. Appl. No. 16/569,073; Advisory Action mailed Jan. 3, 2023; 2 pp.

USPTO; U.S. Appl. No. 16/569,073; Final Office Action mailed Sep. 27, 2022; 16 pp.

USPTO; U.S. Appl. No. 16/569,073; Non-final Office Action (Restriction Requirement) mailed Jun. 24, 2021; 7 pp.

USPTO; U.S. Appl. No. 16/569,073; Non-final Office Action mailed Jan. 30, 2023; 8 pp.

USPTO; U.S. Appl. No. 16/569,073; Non-final Office Action mailed Mar. 22, 2022; 19 pp.

USPTO; U.S. Appl. No. 16/569,073; Notice of Allowance and Fees Due (PTOL-85) mailed Jul. 19, 2023; (pp. 1-5).

* cited by examiner

INTERLOCKING LADDERS AND COMPONENTS THEREOF

CROSS-REFERENCE TO RELATED APPLICATIONS

This application is a continuation of U.S. application Ser. No. 16/569,073, filed Sep. 12, 2019, and is hereby incorporated herein in its entirety.

FIELD

The present invention is related to an interlocking ladder system for transporting at least two ladders which are stacked together. (As used herein, references to the "present invention" or "invention" relate to exemplary embodiments and not necessarily to every embodiment encompassed by the appended claims.) More specifically, the present invention is related to an interlocking ladder system for transporting at least two ladders which are stacked together using at least one of end caps, or rail shields, or guide brackets on the two ladders which engage with each other to hold the ladders firmly together so they do not slip or move sideways relative to each other during transportation.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Ladders, after their production, are commonly stacked on top of each other for transport. There are no specific features on ladders currently that are meant to help with ladder stacking to secure the ladders for shipping purposes and prevent unnecessary ladder movements when they are stacked to avoid damage to the ladders or the containers in which they are located, and/or quicken the stacking process. Ladders are currently secured with cardboard and banding straps or dedicated clips separate and apart from the ladders themselves and are removed from the ladders when the ladders are unstacked. It would be desirable to minimize the amount of or even eliminate packing materials (cardboard, banding, tape, etc.) necessary to secure the ladders for shipping and the time needed to secure the ladders for shipping.

BRIEF SUMMARY

The present invention pertains to an interlocking ladder system for transporting at least two ladders which are stacked together. The ladder system comprises a first ladder having a first end cap having a cap portion and an engagement portion with a slot. The ladder system comprises a second ladder having a second end cap having a cap portion and an engagement portion with a slot, and preferably a third end cap having a cap portion and an engagement portion with a slot. The slot of the engagement portion of the second end cap engages with the slot of the engagement portion of the first end cap when the second ladder is stacked on top of the first ladder to interlock and prevent the first and second ladders moving sideways relative to each other. The ladder system may comprise a third ladder having a fourth end cap having a cap portion and an engagement portion and a slot. The slot of the engagement portion of the third end cap engages with the slot of the engagement portion of the fourth end cap when the third ladder is stacked on top of the second ladder. The second ladder stacked on top of the first ladder and preferably the third ladder stacked on top of the second ladder all together form a stack. The slot of the engagement portions of the first and second end caps fit together and directly contact each other, and the slot of the engagement portions of the third and fourth end caps fit together and directly contact each other in the stack when there is a third ladder.

The present invention pertains to an interlocking ladder system for transporting at least two ladders which are stacked together. The ladder system comprises a first ladder having a first end cap having a cap portion and an engagement portion with a slot. The ladder system comprises a second ladder having a second end cap having a cap portion and an engagement portion with a slot, and preferably a first rail shield having a shield portion and an engagement portion with a slot. The slot of the engagement portion of the second end cap engages with the slot of the engagement portion of the first end cap when the second ladder is stacked on top of the first ladder to interlock and prevent the first and second ladders moving sideways relative to each other. The ladder system may comprise a third ladder having a second rail shield having a shield portion and an engagement portion and a slot. The slot of the engagement portion of the second rail shield engages with the slot of the engagement portion of the first rail shield when the third ladder is stacked on top of the second ladder. The second ladder stacked on top of the first ladder and preferably the third ladder stacked on top of the second ladder all together form a stack. The slot of the engagement portions of the first and second end caps fit together and directly contact each other, and the slot of the engagement portions of the first and second rail shields fit together and directly contact each other in the stack when there is a third ladder.

The present invention pertains to an interlocking ladder system for transporting at least two ladders which are stacked together. The ladder system comprises a first ladder having a first guide bracket having a guide portion and an engagement portion with a slot. The ladder system comprises a second ladder having a second guide bracket having a guide portion and an engagement portion with a slot, and preferably a third rail cap having a shield portion and an engagement portion with a slot. The slot of the engagement portion of the second guide bracket engages with the slot of the engagement portion of the first guide bracket when the second ladder is stacked on top of the first ladder to interlock and prevent the first and second ladders moving sideways relative to each other. The ladder system may comprise a third ladder having a fourth end cap having a cap portion and an engagement portion and a slot. The slot of the engagement portion of the third end cap engages with the slot of the engagement portion of the fourth end cap when the third ladder is stacked on top of the second ladder. The second ladder stacked on top of the first ladder and preferably the third ladder stacked on top of the second ladder all together form a stack. The slot of the engagement portions of the third and fourth end caps fit together and directly contact each other, and the slot of the engagement portions of the first and second rail shields fit together and directly contact each other in the stack when there is a third ladder.

The present invention pertains to a method for stacking ladders into a stack. The method comprises the steps of placing a first ladder flat on ground. The first ladder having a first end cap having a cap portion and an engagement portion with a slot. There is the step of placing a second ladder having a second end cap having a cap portion and an engagement portion with a slot onto the first ladder so the slot of the engagement portion of the second end cap engages with the slot of the engagement portion of the first end cap when the second ladder is stacked on top of the first ladder to interlock and prevent the first and second ladders moving sideways relative to each other. Preferably, the second ladder has a third end cap having a cap portion and an engagement portion with a slot. There is then preferably the step of placing a third ladder having a fourth end cap having a cap portion and an engagement portion with a slot onto the second ladder so the slot of the engagement portion of the third end cap engages with the slot of the engagement portion of the fourth end cap when the third ladder is stacked on top of the second ladder. The second ladder stacked on top of the first ladder and preferably the third ladder stacked on top of the second ladder all together form a stack. The slot of the engagement portions of the first and second end caps fit together and directly contact each other, and the slot of the engagement portions of the third and fourth end caps fit together and directly contact each other in the stack when there is a third ladder.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION

Figure 1:
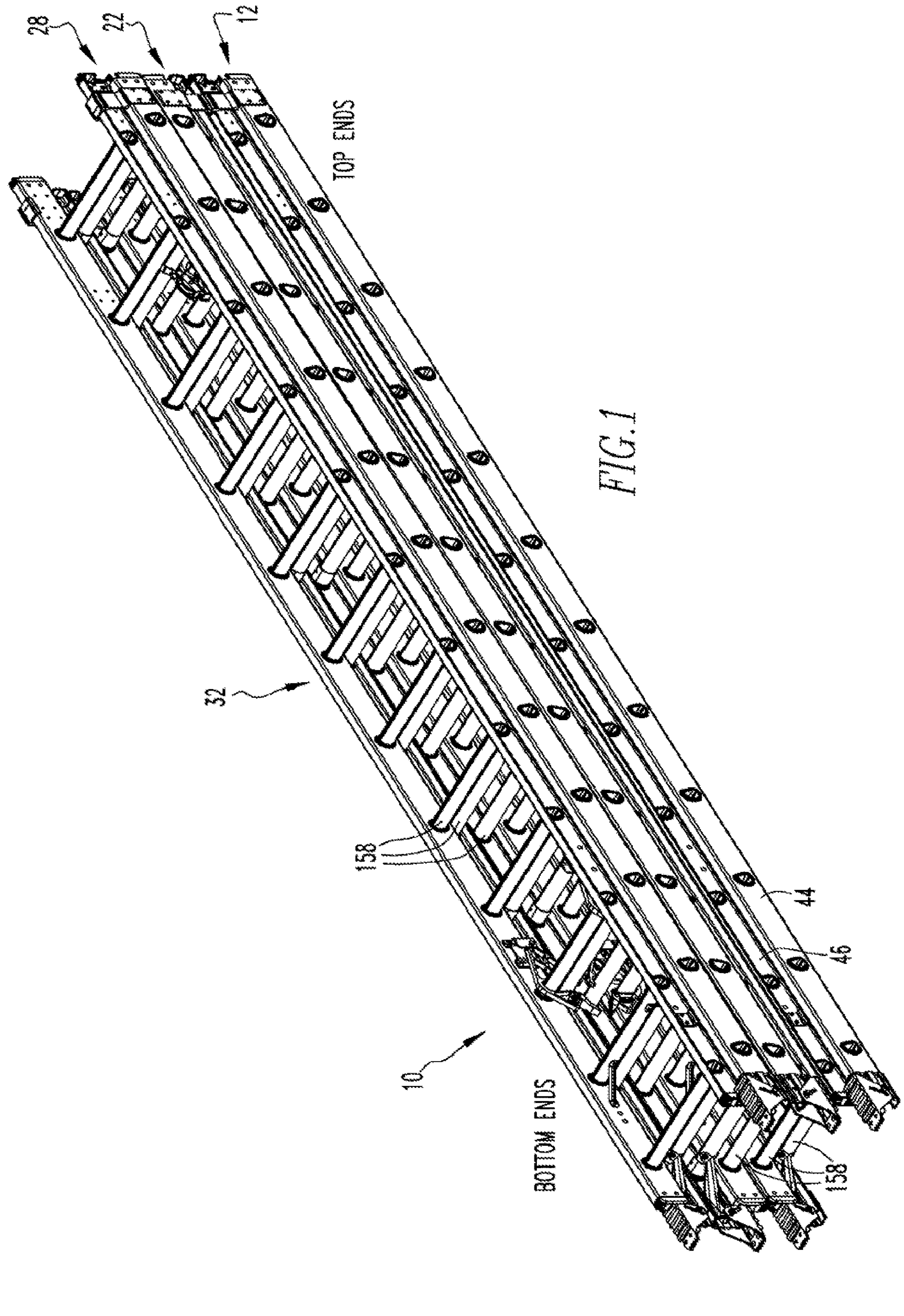
FIG. 1 is a perspective view of three ladders stacked together to form a stack.
Figure 2:
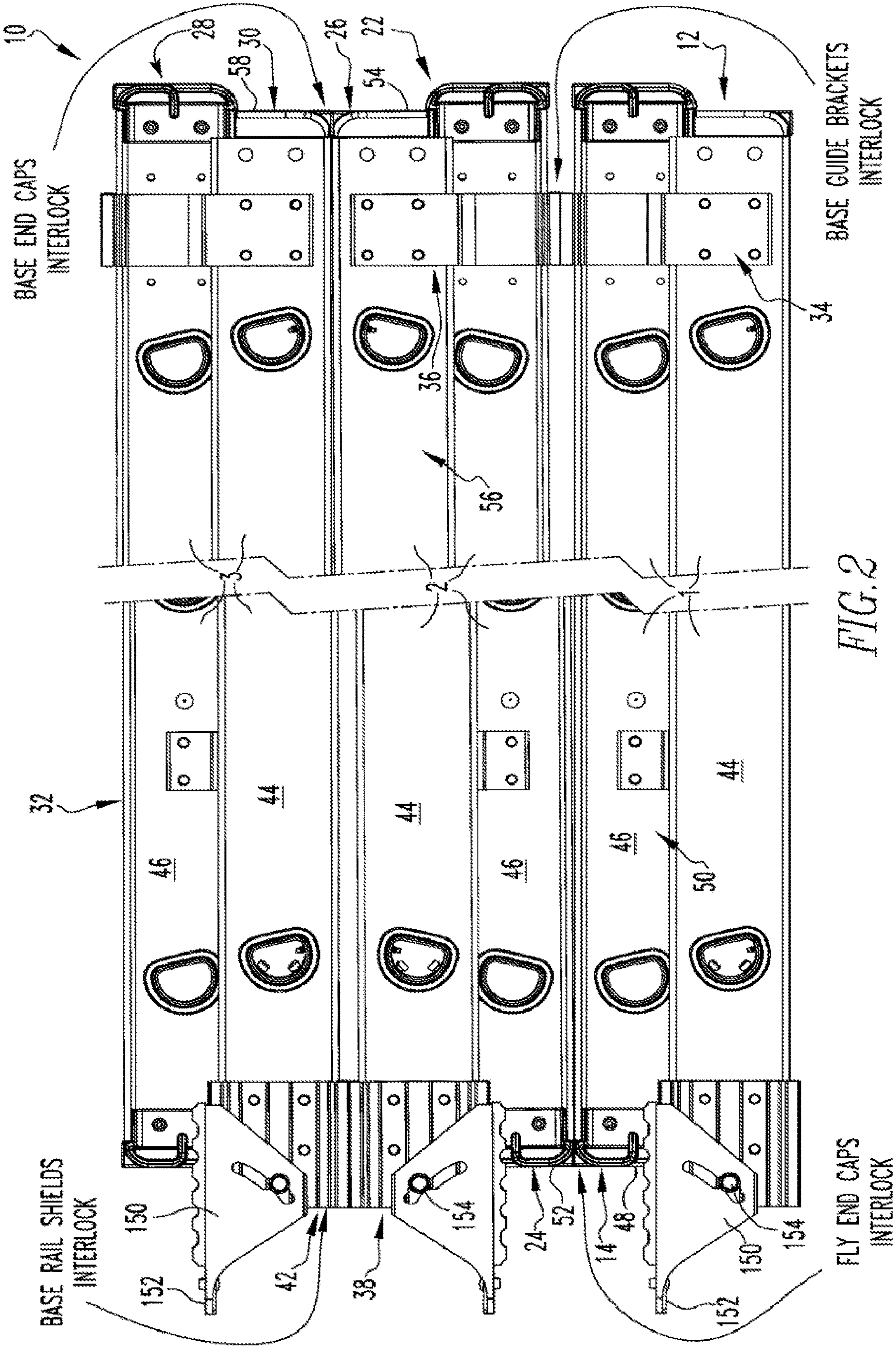
FIG. 2 is a side view of the three ladders stacked together to form a stack.
Figure 3:
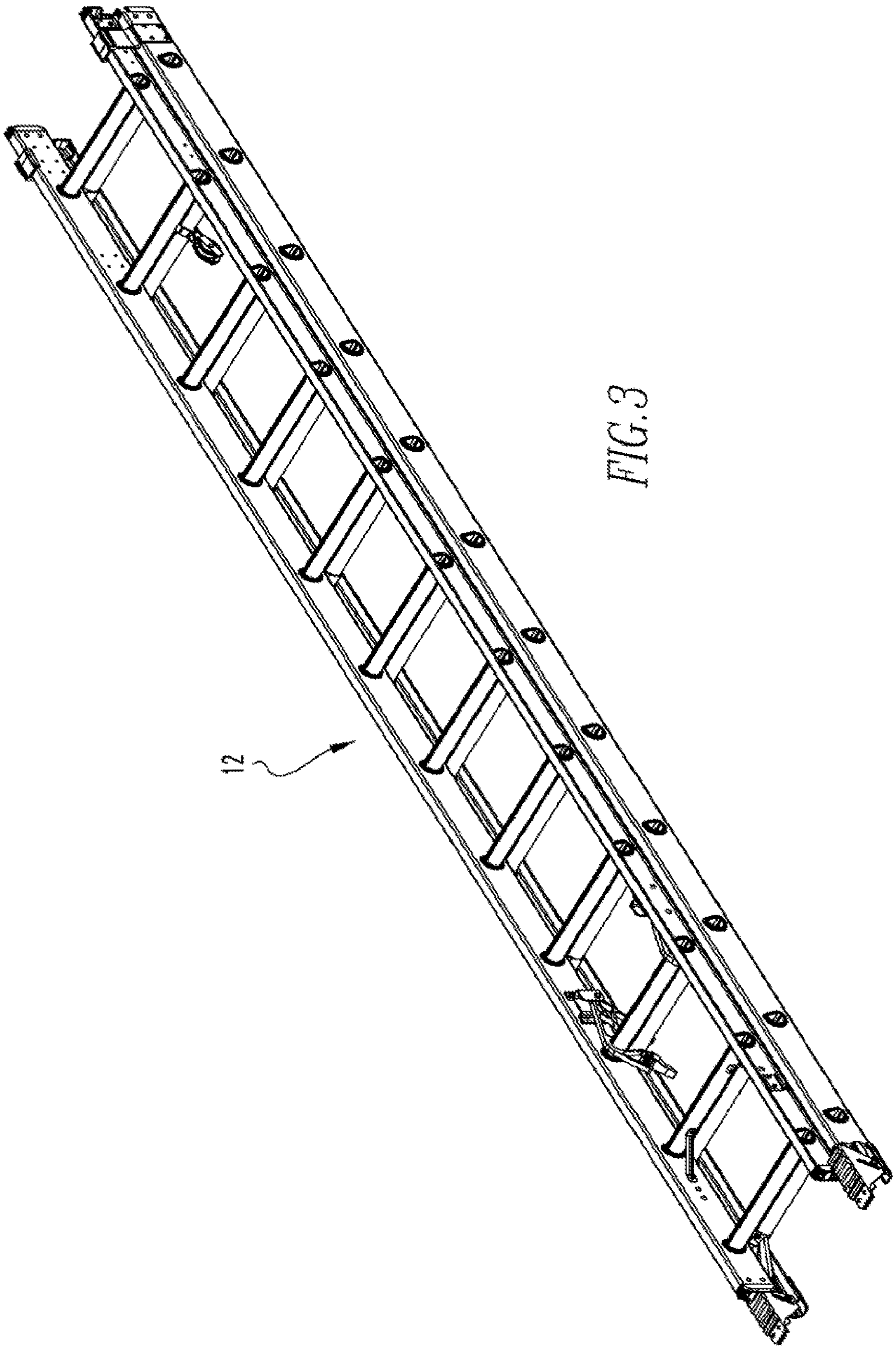
FIG. 3 is a perspective view of a ladder of the present invention.
Figure 4:
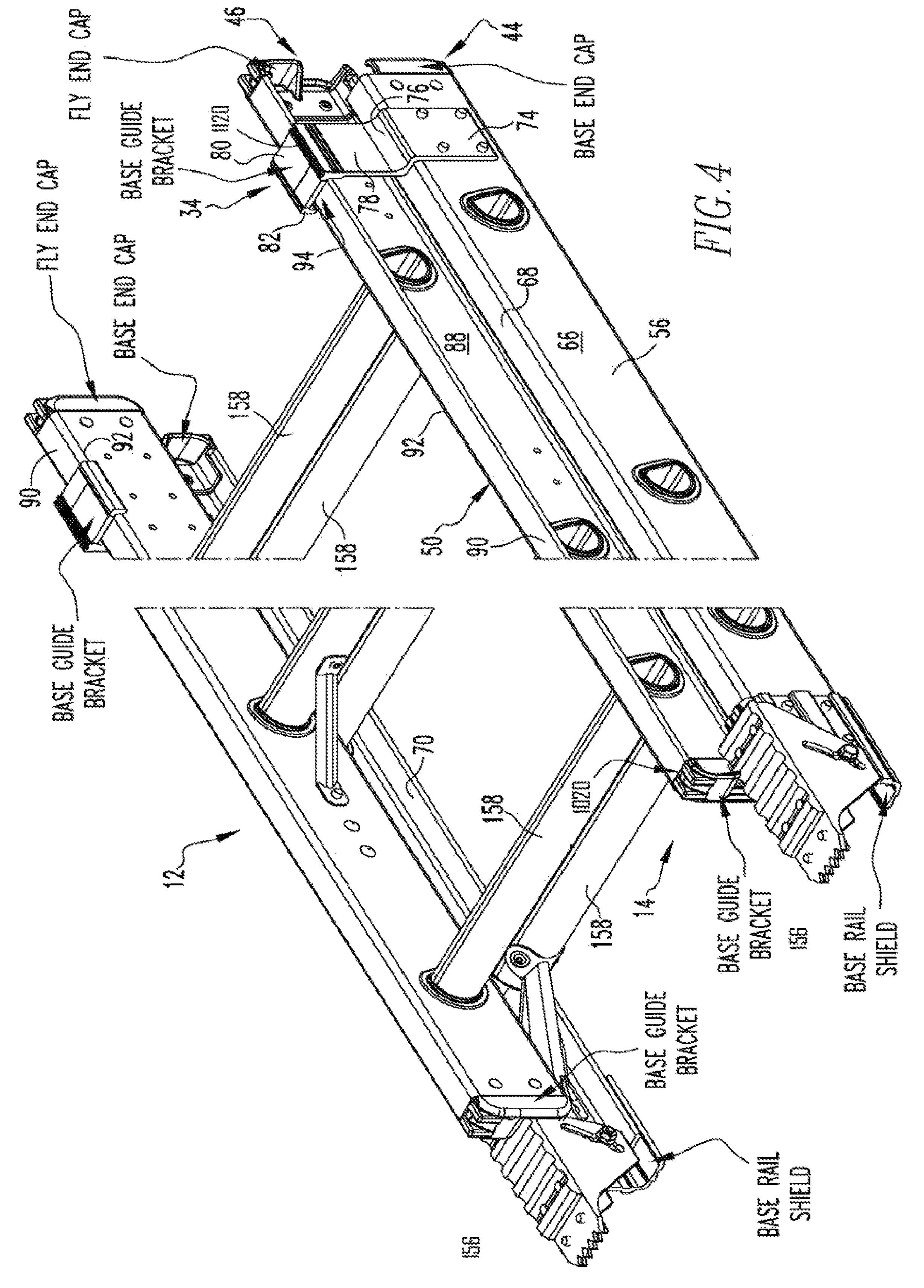
FIG. 4 is a perspective view showing the interlocking components on a ladder.
Figure 5:
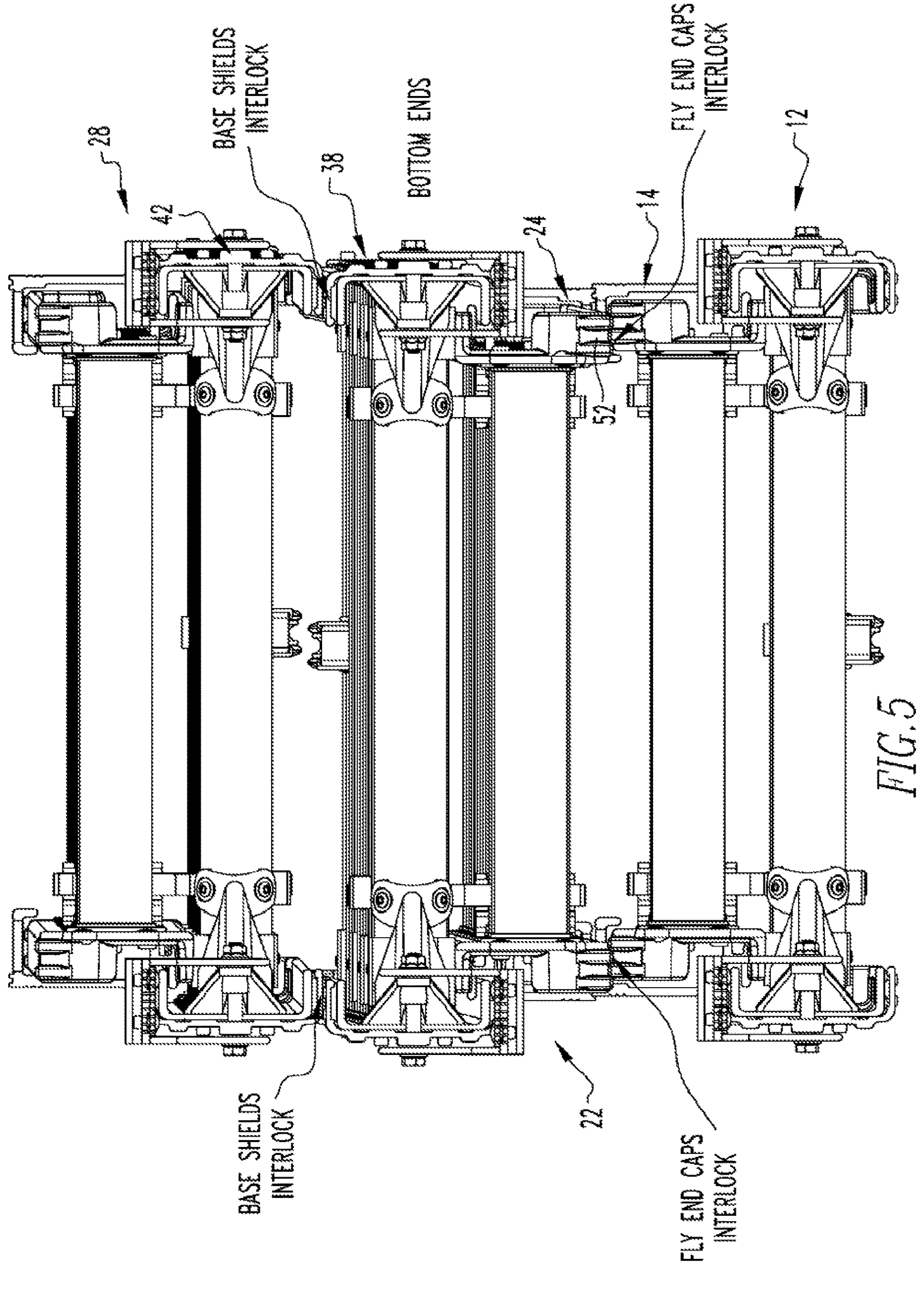
FIG. 5 is a bottom end view of a stack.

Referring now to the drawings wherein like reference numerals refer to similar or identical. parts throughout the several views, and more specifically to FIGS. 1-8, 13 and 14 thereof, there is shown an interlocking ladder system 10 for transporting at least two ladders, and preferably three ladders, which are stacked together. The ladder system 10 comprises a first ladder 12 having a first end cap 14 having a cap portion 16 and an engagement portion 18 (end cap engagement portion) with a slot 20. The ladder system 10 comprises a second ladder 22 having a second end cap 24 having a cap portion 16 and an engagement portion 18 (end cap engagement portion) with a slot 20, and preferably a third end cap 26 having a cap portion 16 and an engagement portion 18 with a slot 20. The slot 20 of the engagement portion 18 of the second end cap 24 engages with the slot 20 of the engagement portion 18 of the first end cap 14 when the second ladder 22 is stacked on top of the first ladder 12 to interlock and prevent the first and second ladders moving sideways relative to each other. The ladder system 10 may comprise a third ladder 28 having a fourth end cap 30 having a cap portion 16 and an engagement portion 18 and a slot 20. The slot 20 of the engagement portion 18 of the third end cap 26 engages with the slot 20 of the engagement portion 18 of the fourth end cap 30 when the third ladder 28 is stacked on top of the second ladder 22. The second ladder 22 stacked on top of the first ladder 12 form a stack 32 and possibly the third ladder 28 stacked on top of the second ladder 22 all together form a stack 32. The slot 20 of the engagement portions 18 of the first and second end caps 14, 24 fit together and directly contact each other and the slot 20 of the engagement portions 18 of the third and fourth end caps 26, 30 fit together and directly contact each other in the stack 32.

Figure 11A:
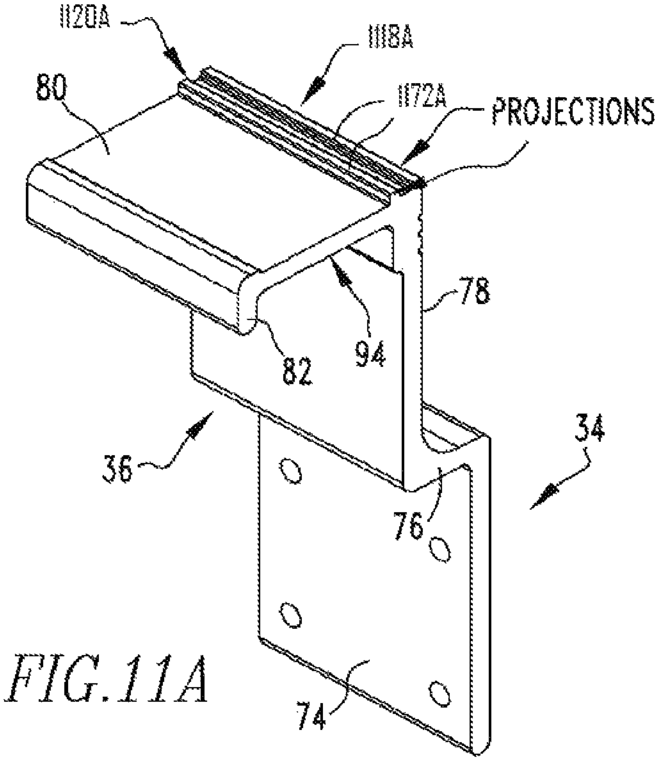
FIGS. 11A and 11B are perspective and side views of a guide bracket.
Figure 11B:
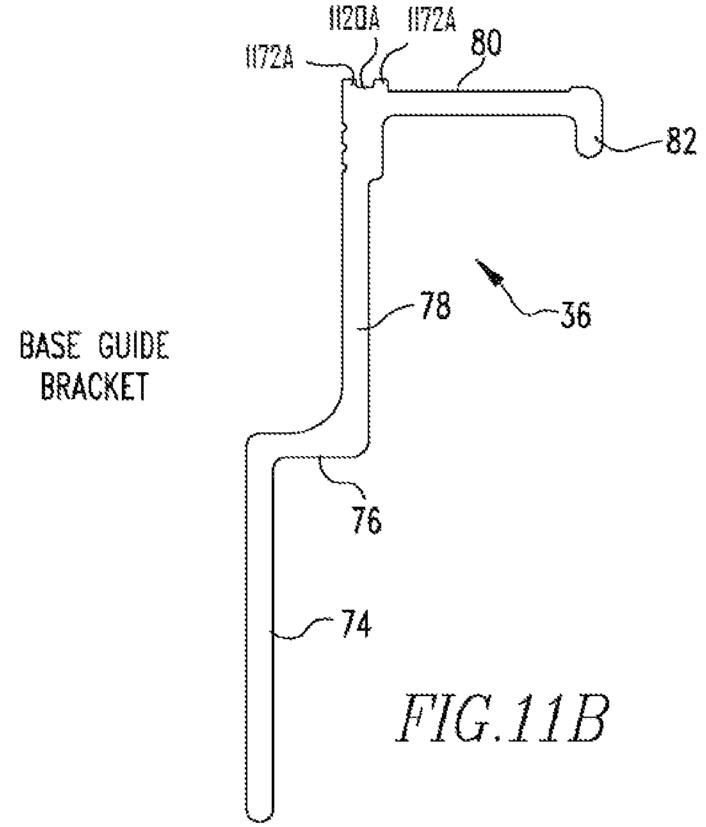

The first ladder 12 may have a first guide bracket 34, as shown in FIGS. 11A and 11B, having a guide portion 36 and an engagement portion 1118A (a bracket engagement portion) with a slot 1120A, and the second ladder 22 may have a second guide bracket 37 having a guide portion 36 and an engagement portion 1118B (a bracket engagement portion) with a slot 1120B. The slot 1120B of the engagement portion 1118B of the second guide bracket 37 engages with the slot 1120A of the engagement portion 1118A of the first guide bracket 34 when the second ladder 22 is stacked on top of the first ladder 12. The slots 1120A, 1120B of the engagement portions 1118A, 1118B of the first and second guide brackets 34, 37 fit together and directly contact each other in the stack 32.

Figure 12A:
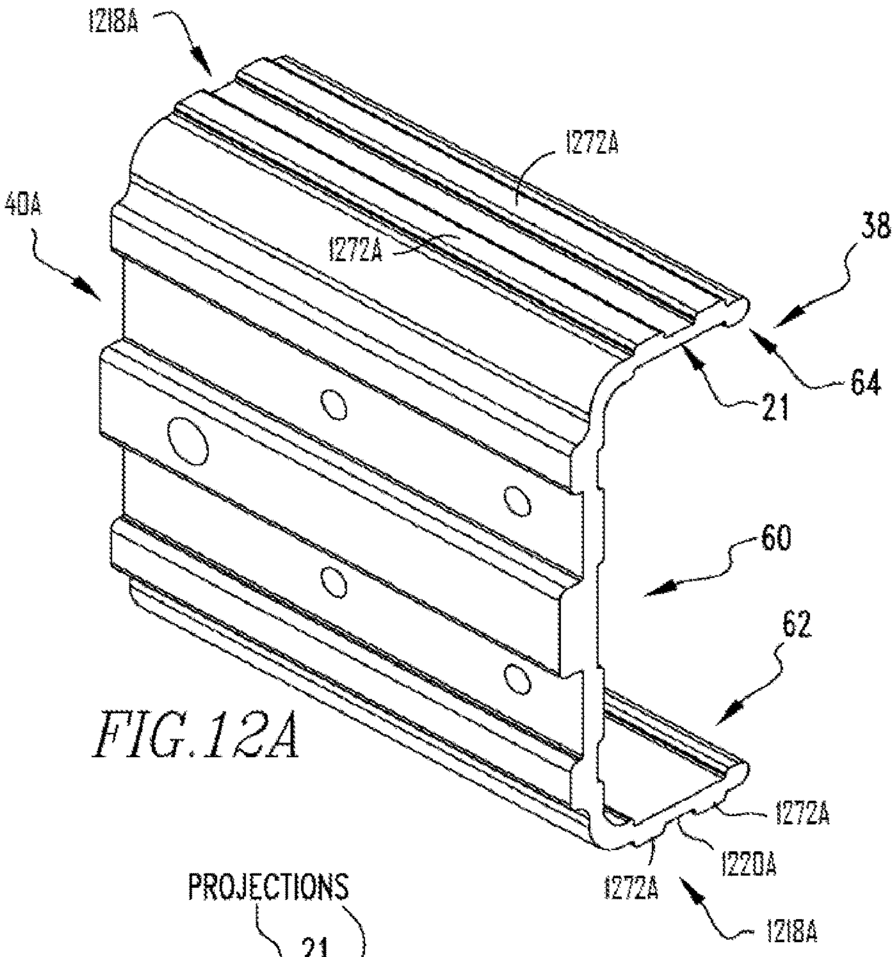
FIGS. 12A and 12B are perspective and side views of a rail shield.
Figure 12B:
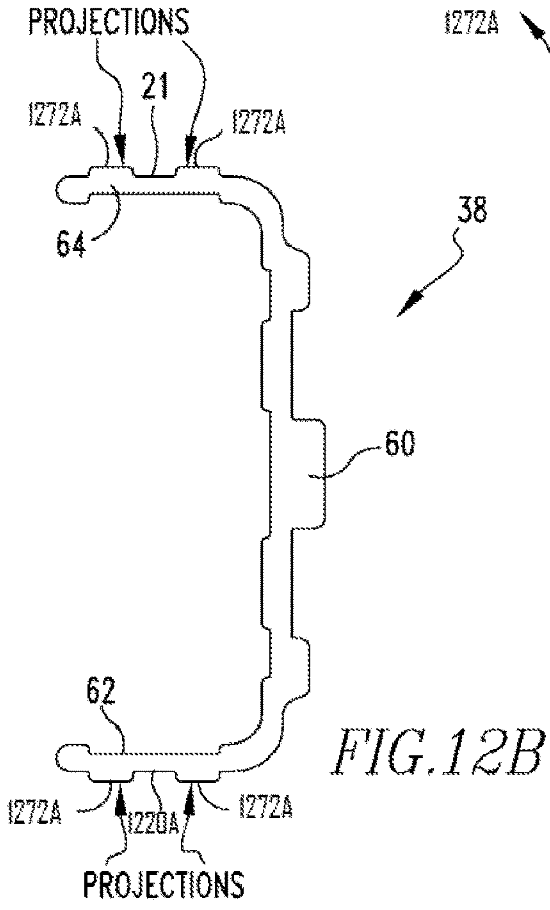

The second ladder 22 may have a first rail shield 38, as shown in FIGS. 12A and 12B, having a shield portion 40A and an engagement portion 1218A (shield engagement portion) with a slot 1220A, and the third ladder 28 may have a second rail shield 42 having a shield portion 40B and an engagement portion 1218B (shield engagement portion) and a slot 1220B. The slot 1220B of the engagement portion 1218B of the second rail shield 42 engages with the slot 1220A of the engagement portion 1218A of the first rail shield 38 when the third ladder 28 is stacked on top of the second ladder 22. The slots 1220A, 1220B of the engagement portions 1218A, 1218B of the first and second rail shields 38, 42 fit together and directly contact each other in the stack 32.

Figure 9A:
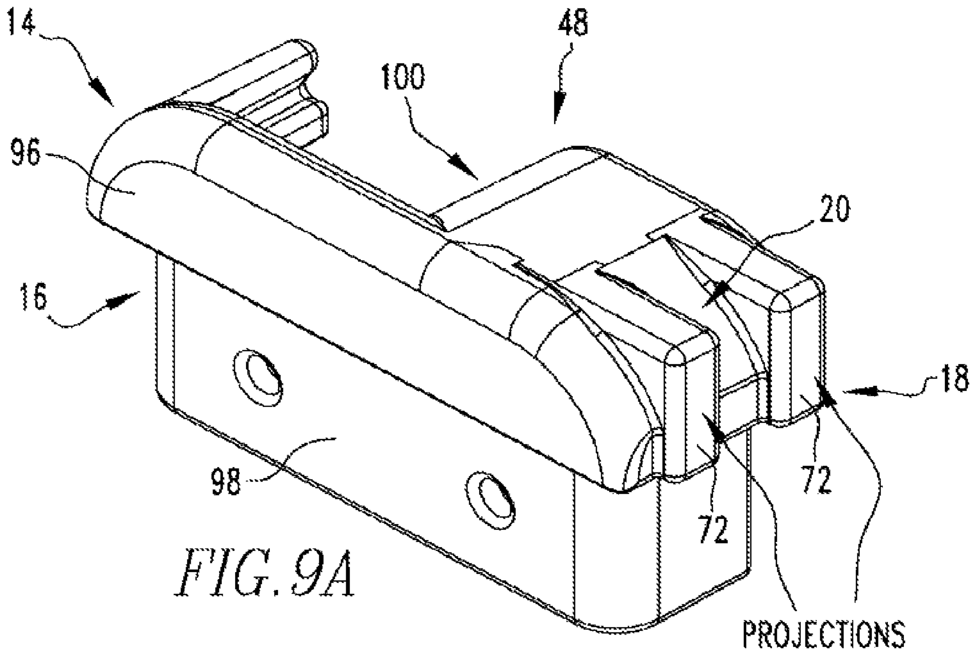
FIGS. 9A, 9B and 9C are perspective views, respectively, of a fly end cap.
Figure 9B:
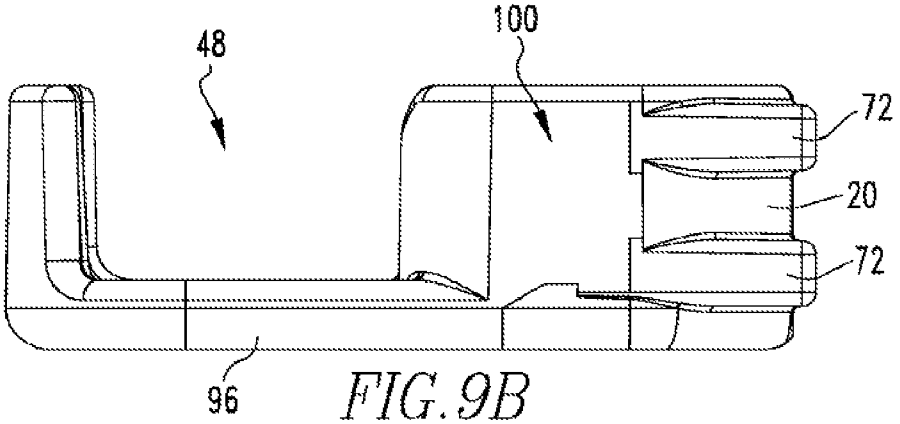
Figure 9C:
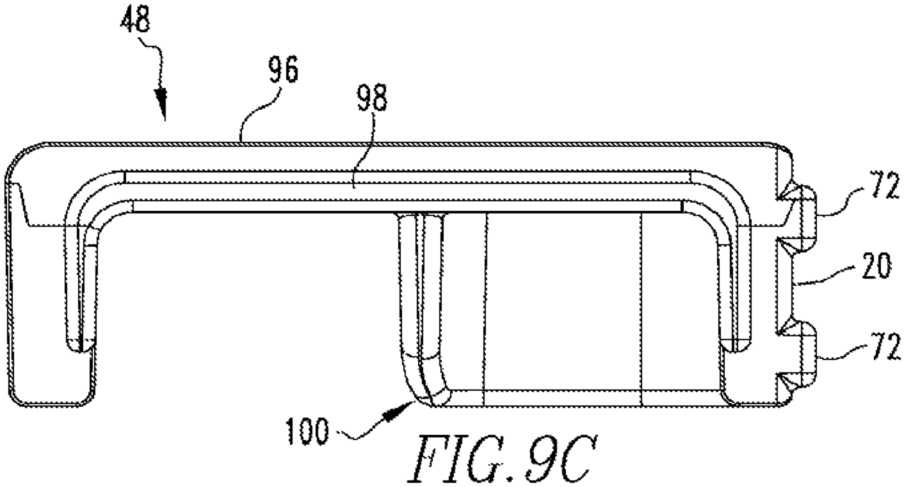
Figure 10A:
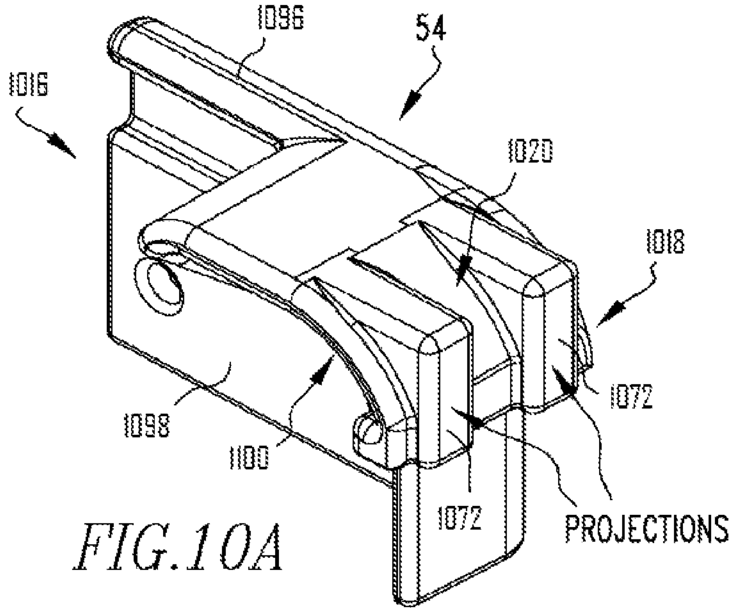
FIGS. 10A, 10B and 10C are perspective, top and bottom views of a base end cap.
Figure 10B:
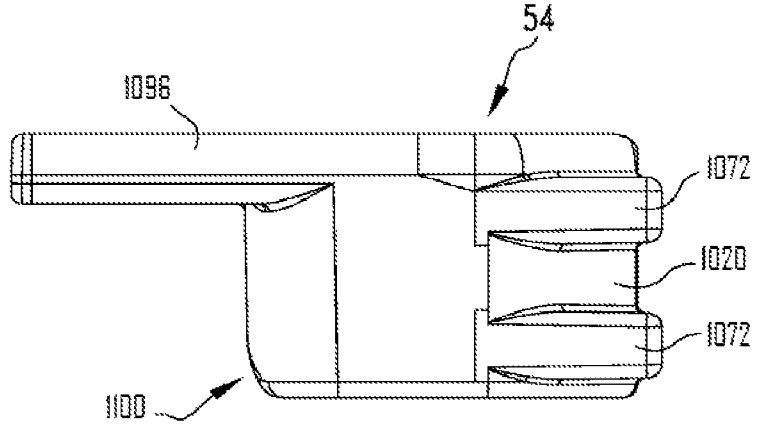
Figure 10C:
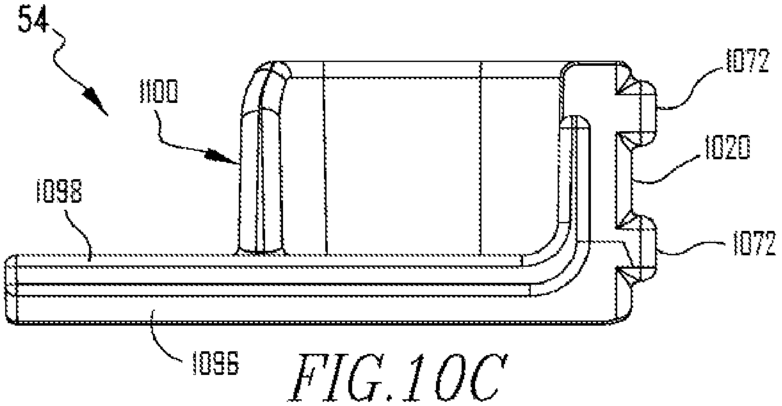

The first ladder 12, the second ladder 22 and the third ladder 28 may each be extension ladders having a base section 44 and a fly section 46 slidably attached to the base section 44. In such an embodiment, the first end cap 14 is a first fly end cap 48, as shown in FIGS. 9A-9C, attached adjacent a bottom end of a first fly rail 50 of the fly section 46 of the first ladder 12 and the second end cap 24 is a second fly end cap 52 attached adjacent a bottom end of a first fly rail 50 of the fly section 46 of the second ladder 22; and the third end cap 26 is a first base end cap 54, as shown in FIGS. 10A-10C, attached adjacent a top end of a first base rail 56 of the base section 44 of the second ladder 22 and the fourth end cap 30 is a second base end cap 58 attached adjacent a top end of a first base rail 56 of the base section 44 of the third ladder 28.

The first guide bracket 34 may be directly attached adjacent a top end of a first base rail 56 of the base section 44 of the first ladder 12 and the bracket portion of the first guide bracket 34 is disposed about the first fly rail 50 of the first ladder 12 and guides the first fly rail 50 of the first ladder 12 as the first guide rail of the first ladder 12 slides relative to the first base rail 56 of the first ladder 12. The second guide bracket 37 is directly attached adjacent a top end of a first base rail 56 of the base section 44 of the second ladder 22 and the bracket portion of the second guide bracket 37 is disposed about the first fly rail 50 of the second ladder 22 and guides the first fly rail 50 of the second ladder 22 as the first fly rail 50 of the second ladder 22 slides relative to the first base rail 56 of the second ladder 22. The first rail shield 38 may be directly attached adjacent a bottom end of the first base rail 56 of the base section 44 of the second ladder 22 and the second rail shield 42 may be directly attached adjacent a bottom end of the first base rail 56 of the base section 44 of the third ladder 28.

The shield portion 40 of each of the first and second rail shields may comprise a shield web 60, a first shield flange 62 which extends perpendicularly from the shield web 60, and a second shield flange 64 which extends perpendicularly from the shield web 60 and in spaced relation and in parallel with the first shield flange 62 with the shield web 60 between the first shield flange 62 and the second shield flange 64. The shield web 60 of the first base rail 56 shield contacts a rail web 66 of the first base rail 56 of the second ladder 22 and the first shield flange 62 contacts a first rail flange 68 of the first base rail 56 of the second ladder 22 and the second shield flange 64 contacts a second rail flange 70 of the first base rail 56 of the second ladder 22. The first shield flange 62 having projections 1272A which form the slot 1220A of the engagement portion 1218A of the first base rail 56 shield and the second shield flange 64 having projections 1272A which form a second slot 21 of the engagement portion 1218A of the first base rail 56 shield. There may be two projections 1272A which extend continuously in parallel to each other across the engagement portion 1218A of the base rail shield. This may be the case regarding the formation of the slots 20 of all engagement portions 18.

The guide portion 36 of each of the first and second guide brackets 34, 37 may comprise a first plate 74, a second plate 76 extending perpendicularly from the first plate 74, a third plate 78 extending perpendicularly from the second plate 76 and in parallel and offset from the first plate 74, a fourth plate 80 extending perpendicularly from the third plate 78 and in parallel and offset from the second plate 76, and a fifth plate 82 extending perpendicularly from the fourth plate 80 and in parallel and offset from the third plate 78. The first and second and third and fourth and fifth plates being one continuous single piece. The first plate 74 of the first guide bracket 34 directly attached to a web 66 of the first base rail 56 of the base section 44 of the first ladder 12. The second plate 76 of the first guide bracket 34 disposed directly alongside and adjacent a first flange 68 of the first base rail 56 of the base section 44 of the first ladder 12. The third plate 78 of the first guide bracket 34 disposed directly alongside and adjacent a web 88 of the first fly rail 50 of the fly section 46 of the first ladder 12. The fourth plate 80 of the first guide bracket 34 disposed directly alongside and adjacent a first flange 90 of the first fly rail 50 of the fly section 46 of the first ladder 12; and the fifth plate 82 of the first guide bracket 34 disposed directly alongside and adjacent an outer edge 92 of the first flange of the first fly rail 50. The third and fourth and fifth plates 78, 80, 82 of the first guide bracket 34 forming a hook 94 that is disposed about the first fly rail 50 of the first ladder 12. The fifth plate 82 having projections 1172A which form the slot 1120A of the engagement portion 1118A of the first guide bracket 34.

The cap portions 16, 1016 of each of the first and second fly end caps 48, 52 and the first and second base end caps 54, 58 may comprise covers 96, 1096 and sides 98, 1098 which extend from the cover 96, 1096, and the engagement portions 18, 1118 (end cap engagement portions) may comprise wings 100, 1100 which extend perpendicularly from the covers 96, 1096. The side 1098 of the first base end cap 54 directly attached to the web of the first base rail 56 of the base section 44 of the second ladder 22. The cover 1096 of the first base end cap 54 covering over an edge of the top end of the first base rail 56 of the base section 44 of the second ladder 22. The wing 1100 of the first base end cap 54 having projections 1072 which form the slot 1020 of the engagement portion 1018 of the first base end cap 54. The side 98 of the first fly end cap 48 directly attached to the web of the first fly rail 50 of the fly section 46 of the first ladder 12. The cover 96 of the first fly end cap 48 covering over an edge of the bottom end of the first fly rail 50 of the fly section 46 of the first ladder 12. The wing 100 of the first fly end cap 48 having projections 72 which form the slot 20 of the engagement portion 18 of the first fly end cap 48.

The present invention pertains to an interlocking ladder system 10 for transporting at least two ladders which are stacked together. The ladder system 10 comprises a first ladder 12 having a first guide bracket 34 having a guide portion 36 and an engagement portion 1118A with a slot 1120A. The ladder system 10 comprises a second ladder 22 having a second guide bracket 37 having a guide portion 36 and an engagement portion 1118B with a slot 1120B, and preferably a first rail shield 38 having a shield portion 40A and an engagement portion 1218A with a slot 1220A. The slot 1120B of the engagement portion 1118B of the second guide bracket 37 engages with the slot 1120A of the engagement portion 1118A of the first guide bracket 34 when the second ladder 22 is stacked on top of the first ladder 12 to interlock and prevent the first and second ladders moving sideways relative to each other. The ladder system 10 may comprise a third ladder 28 having a second rail shield 42 having a shield portion 40B and an engagement portion 1218B and a slot 1220B. The slot 1220B of the engagement portion 1218B of the second rail shield 42 engages with the slot 1220A of the engagement portion 1218A of the first rail shield 38 when the third ladder 28 is stacked on top of the second ladder 22. The second ladder 22 stacked on top of the first ladder 12 form a stack 32 and preferably the third ladder 28 stacked on top of the second ladder 22 all together form a stack 32. The slots 1120A, 1120B of the engagement portions 1118A, 1118B of the first and second guide brackets 34, 37 fit together and directly contact each other and the slot 20 of the engagement portions 18 of the first and second rail shields 38, 42 fit together and directly contact each other in the stack 32.

The present invention pertains to an interlocking ladder system 10 for transporting at least two ladders which are stacked together. The ladder system 10 comprises a first ladder 12 having a first end cap 14 having a cap portion 16 and an engagement portion 18 with a slot 20. The ladder system 10 comprises a second ladder 22 having a second end cap 24 having a cap portion 16 and an engagement portion 18 with a slot 20, and preferably a first rail shield 38 having a shield portion 40A and an engagement portion 1218A with a slot 1220A. The slot 20 of the engagement portion 18 of the second end cap 24 engages with the slot 20 of the engagement portion 18 of the first end cap 14 when the second ladder 22 is stacked on top of the first ladder 12 to interlock and prevent the first and second ladders moving sideways relative to each other. The ladder system 10 may comprise a third ladder 28 having a second rail shield 42 having a shield portion 40 and an engagement portion 18 and a slot 20. The slot 1220B of the engagement portion 1218B of the second rail shield 42 engages with the slot 1220A of the engagement portion 1218A of the first rail shield 38 when the third ladder 28 is stacked on top of the second ladder 22. The second ladder 22 stacked on top of the first ladder 12 form a stack 32 and the third ladder 28 stacked on top of the second ladder 22 all together form a stack 32. The slot 20 of the engagement portions 18 of the first and second end caps 14, 24 fit together and directly contact each other and the slots 1220A, 1220B of the engagement portions 1218A, 1218B of the first and second rail shields 38, 42 fit together and directly contact each other in the stack 32.

The present invention pertains to an interlocking ladder system 10 for transporting at least two ladders which are stacked together. The ladder system 10 comprises a first ladder 12 having a first guide bracket 34 having a guide portion 36 and an engagement portion 1118A with a slot 1120A. The ladder system 10 comprises a second ladder 22 having a second guide bracket 37 having a guide portion 36 and an engagement portion 1118B with a slot 1120B, and preferably a third rail cap having a shield portion 40 and an engagement portion 18 with a slot 20. The slot 1120B of the engagement portion 1118B of the second guide bracket 37 engages with the slot 1120A of the engagement portion 1118A of the first guide bracket 34 when the second ladder 22 is stacked on top of the first ladder 12 to interlock and prevent the first and second ladders moving sideways relative to each other. The ladder system 10 may comprise a third ladder 28 having a fourth end cap 30 having a cap portion 16 and an engagement portion 18 and a slot 20. The slot 20 of the engagement portion 18 of the third end cap 26 engages with the slot 20 of the engagement portion 18 of the fourth end cap 30 when the third ladder 28 is stacked on top of the second ladder 22. The second ladder 22 stacked on top of the first ladder 12 form a stack 32 and the third ladder 28 stacked on top of the second ladder 22 all together form a stack 32. The slot 20 of the engagement portions 18 of the third and fourth end caps 26, 30 fit together and directly contact each other and the slot 20 of the engagement portions 18 of the first and second rail shields 38, 42 fit together and directly contact each other in the stack 32.

The present invention pertains to a method for stacking ladders into a stack 32. The method comprises the steps of placing a first ladder 12 flat on ground. The first ladder 12 having a first end cap 14 having a cap portion 16 and an engagement portion 18 with a slot 20. There is the step of placing a second ladder 22 having a second end cap 24 having a cap portion 16 and an engagement portion 18 with a slot 20 onto the first ladder 12 so the slot 20 of the engagement portion 18 of the second end cap 24 engages with the slot 20 of the engagement portion 18 of the first end cap 14 when the second ladder 22 is stacked on top of the first ladder 12 to interlock and prevent the first and second ladders moving sideways relative to each other. The second ladder 22 may have a third end cap 26 having a cap portion 16 and an engagement portion 18 with a slot 20. There is then the step of placing a third ladder 28 having a fourth end cap 30 having a cap portion 16 and an engagement portion 18 with a slot 20 onto the second ladder 22 so the slot 20 of the engagement portion 18 of the third end cap 26 engages with the slot 20 of the engagement portion 18 of the fourth end cap 30 when the third ladder 28 is stacked on top of the second ladder 22. The second ladder 22 stacked on top of the first ladder 12 form a stack 32 and the third ladder 28 stacked on top of the second ladder 22 all together form a stack 32. The slot 20 of the engagement portions 18 of the first and second end caps 14, 24 fit together and directly contact each other and the slot 20 of the engagement portions 18 of the third and fourth end caps 26, 30 fit together and directly contact each other in the stack 32.

Here, ground is any surface upon which the first ladder 12 is placed to initiate the stacking process. For instance, ground may be a floor or a platform or a table or the ground itself. Furthermore, when the second ladder 22 is placed on the first ladder 12 so the slot 20 of the engagement portion 18 of the second end cap 24 engages with and fits in the slot 20 of the first end cap 14 of the first ladder 12, the second ladder 22 is slightly offset to the side of the first ladder 12 so the slots 20 fit together and engage. By the slots 20 fitting together and engaging, the projections 72 engage the slots 20 and act as stops from the ladders moving sideways relative to each other during transportation. When the third ladder 28 is placed on the second ladder 22, and for that matter, any subsequent ladders placed on top of each other to form the stack 32, the third ladder 28, and each subsequent ladder are slightly offset to the side relative to the ladder upon which the subsequent ladder is placed so the respective slots 20 will fit together, engage and interlock. For instance, the projections of the engagement portion of the second fly end cap on the second ladder on top of the first ladder fit into the slot of the first fly end cap of the. first ladder directly below the second ladder and thus the projections of the first fly end cap fit into the slot of the second fly end cap. In this way, the bottom of the projections of the second fly end cap fit below the top of the projections of the first fly end cap and the top of the projections of the first fly end cap fit above the bottom of the projections of the second fly end cap. With this physical relation, the top of the projections of the first fly end cap contact the bottom of the projections of the second fly end cap and vice versa when the second ladder moves sideways relative to the first ladder; and the opposing projections act as stops from the first and second ladders moving sideways relative to each other. This is the case for all the projections and slots which engage and interlock.

The first ladder 12, the second ladder 22 and the third ladder 28 may each be extension ladders having a base section 44 and a fly section 46 slidably attached to the base section 44. In such an embodiment, the placing the third ladder 28 step includes the step of interlocking rail shields and base end caps of the base section 44 of the second ladder 22 with rail shields and base end caps of the base section 44 of the third ladder 28 when the base section 44 of second ladder 22 encounters the base section 44 of the third ladder 28; and the placing the second ladder 22 step includes the step of interlocking fly end caps and base guide brackets of the fly section 46 of the second ladder 22 with fly end caps and the base guide brackets of the first ladder 12 when the fly section 46 of the second ladder 22 encounters the fly section 46 of the first ladder 12. It is preferable that fly and base end caps, and base guide brackets and base rail shields, all having slots 20, are all present on each ladder in the stack 32 to provide the most secure stack 32 for transportation.

Figure 6:
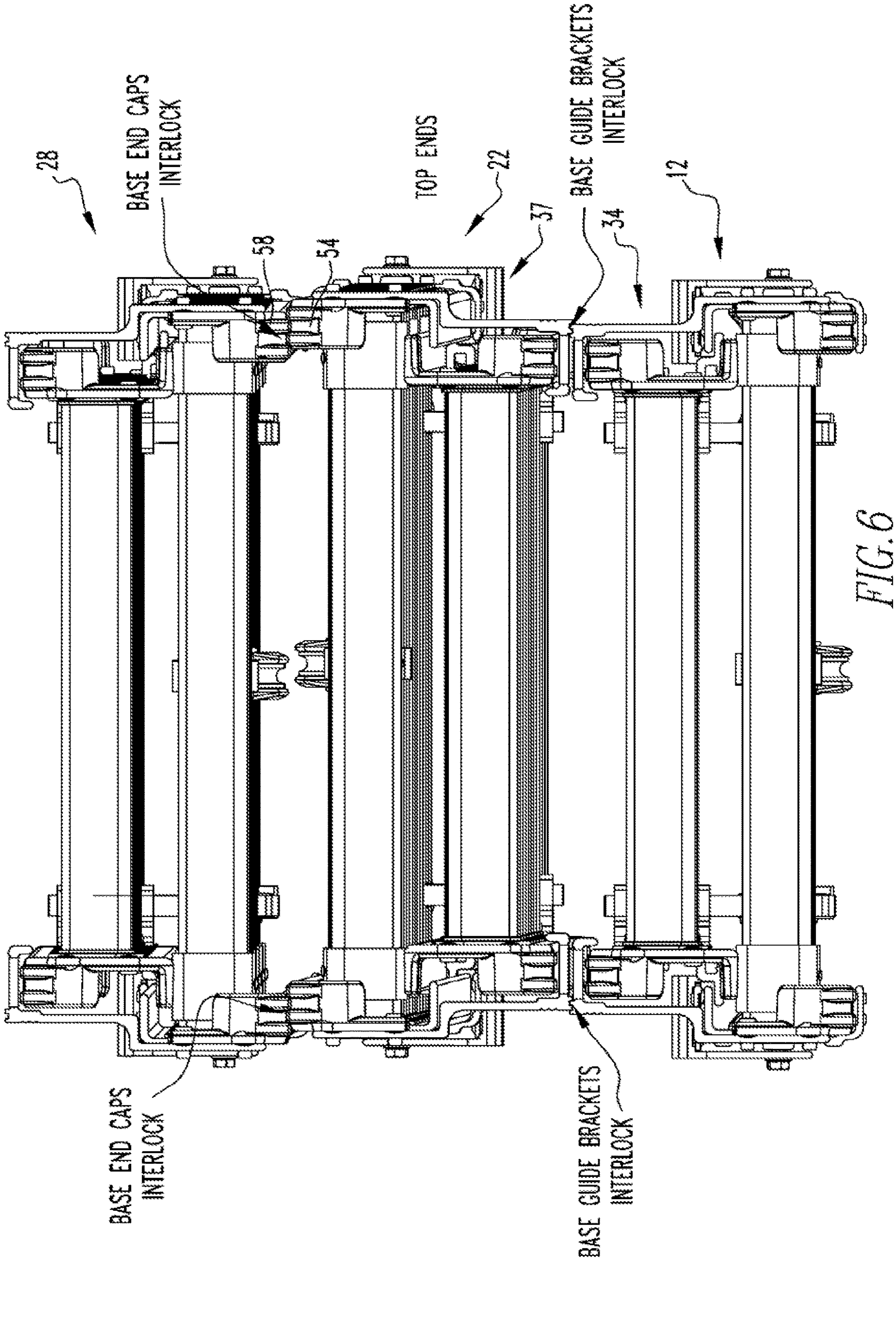
FIG. 6 is a top end view of a stack.
Figure 7:
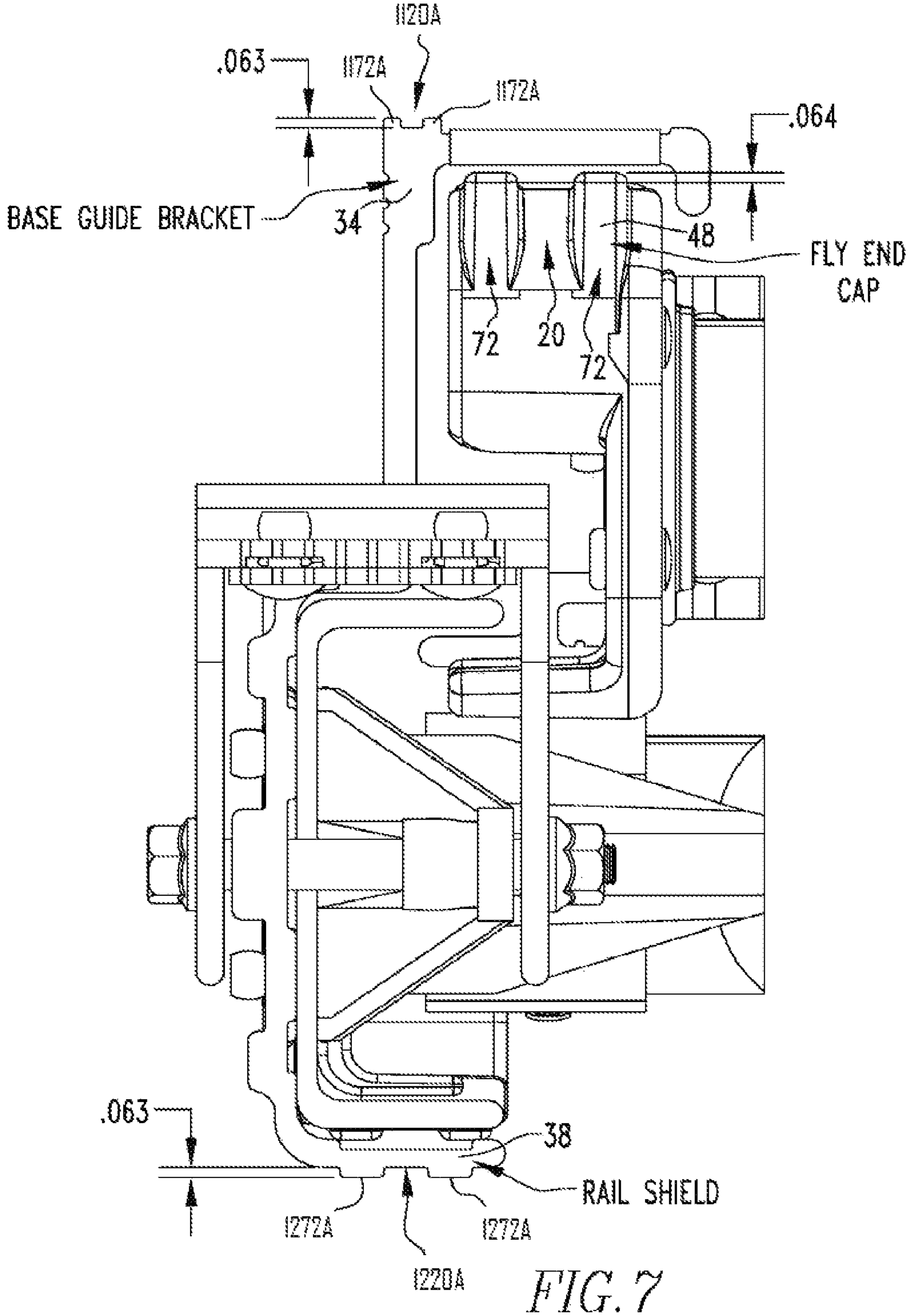
FIG. 7 is a detailed view of a bottom end portion of the ladder.
Figure 8:
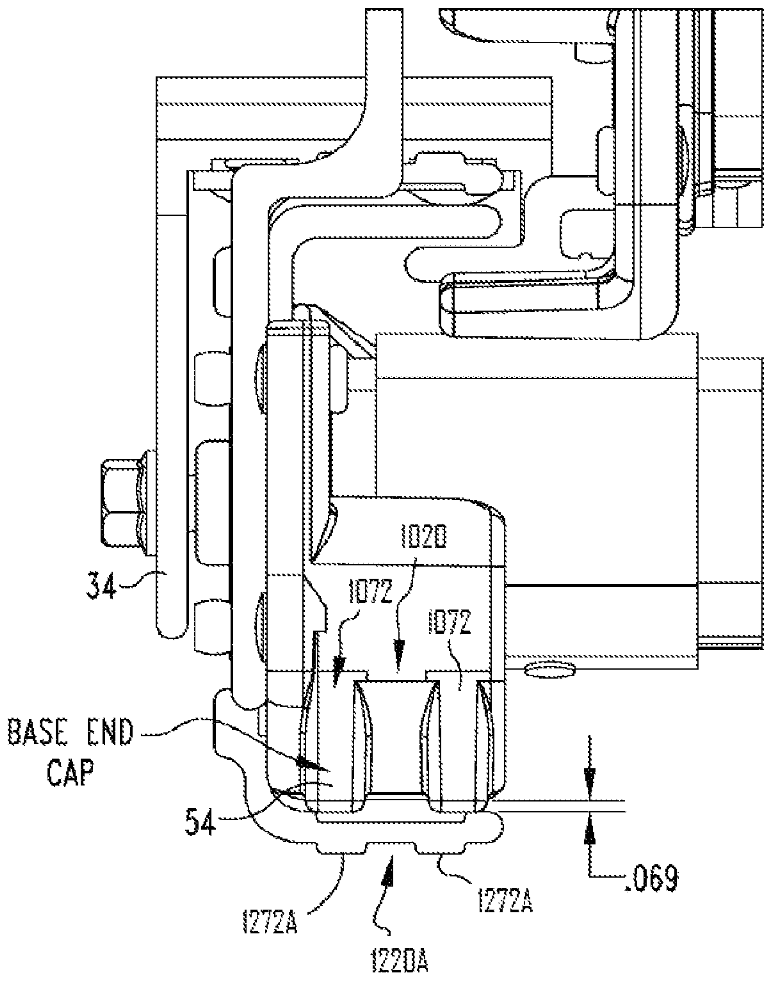
FIG. 8 is a detailed view of a top end portion of the ladder.
Figure 13:
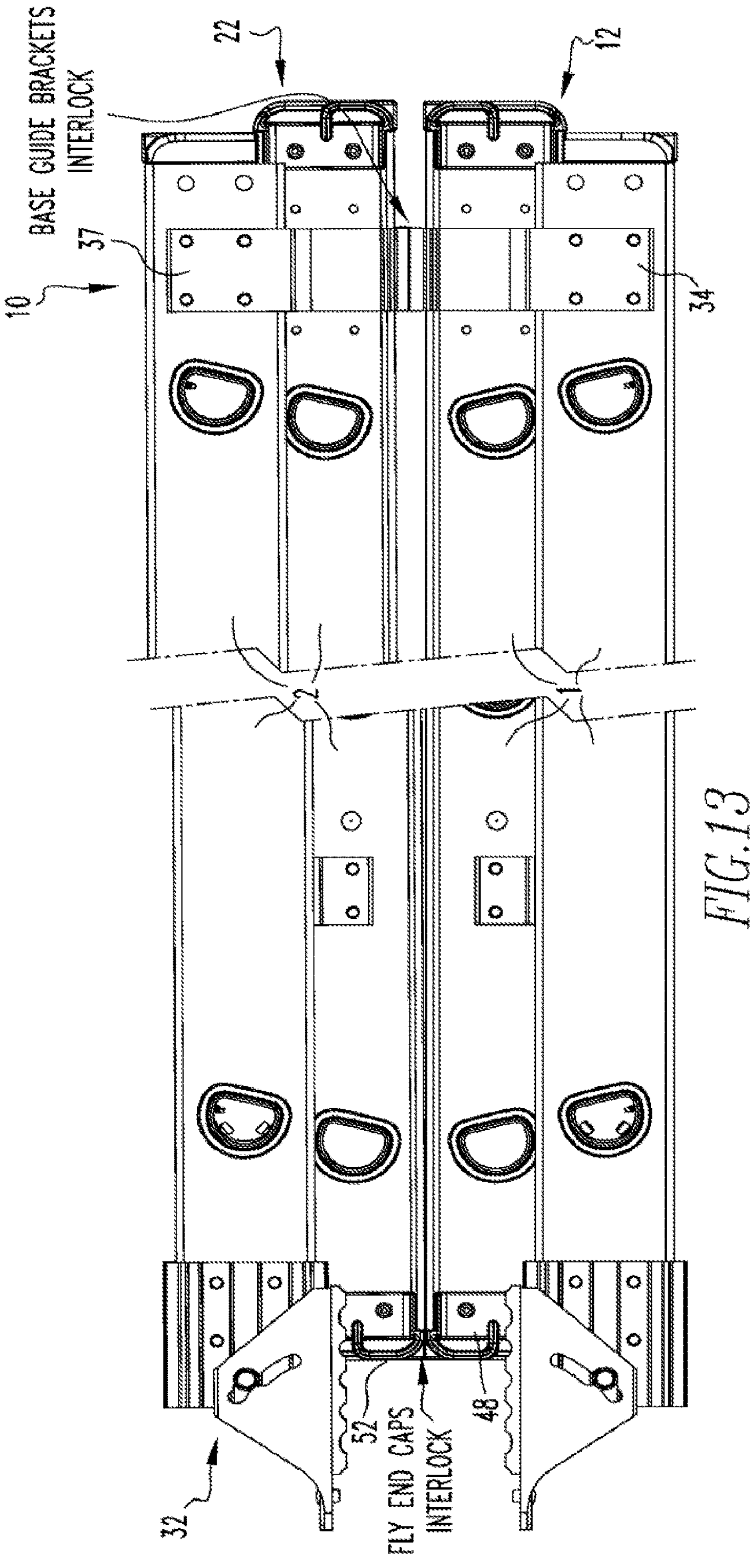
FIG. 13 is a side view of two ladders stacked fly to fly.
Figure 14:
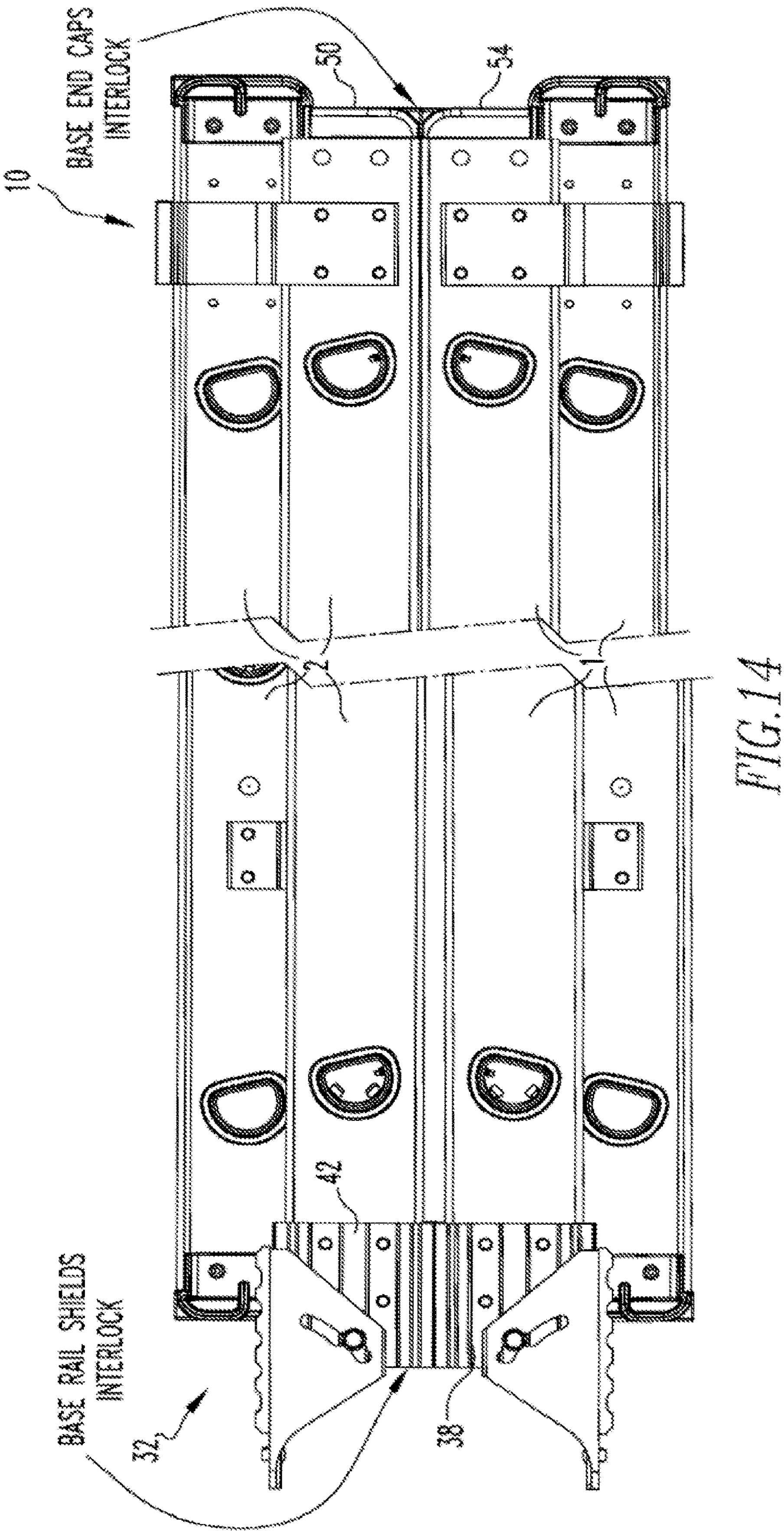
FIG. 14 is a side view of two ladders stacked base to base.

FIG. 6 shows how a stack 32 is laid down. The first or bottom ladder is laid with its base section 44 on the ground and the fly section 46 on top. The second ladder 22 is laid with the fly section 46 down and the base section 44 on top. The third ladder 28 is laid with the base section 44 down and the fly section 46 on top. The fourth ladder (not shown) would be fly section 46 down and base section 44 up, etc. for as many ladders as desired to be stacked. For instance, eight or ten ladders could be securely stacked together in this way. For two extension ladders, as shown in FIG. 13, the fly section of one extension ladder is stacked to the fly section of the second ladder; and as shown in FIG. 14, the base section of one extension ladder is stacked to the base section of the second ladder. Basically, base section to base section and fly section to fly section.

When the base of one ladder encounters the base of the next ladder, the base rail shields and the base end caps interlock. When the fly of one ladder encounters the fly of the next ladder, the fly end caps and the base guide brackets interlock.

Each base rail may have a shoe 150 with a spur plate 152 that is attached to the base rail through the respective rail shield with a bolt 154. The shoe 150 may have a tread 156 attached to the shoe 150 under the spur plate 152. Each section has rungs 158 attached between the respective rails of each section, with the respective rails of each section in parallel and spaced relation.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An apparatus comprising a guide bracket for a ladder including a first rail and a second rail, the guide bracket including:

a flange portion including a first plate; and a hooked portion cantilevered from the flange portion by a second plate, the hooked portion formed by a third plate extending perpendicularly to a fourth plate, the hooked portion including a first engagement projection and a second engagement projection that extend from an outer surface of the fourth plate, the first engagement projection spaced from the second engagement projection and defining a slot therebetween, the slot extending substantially along an entire length of the fourth plate, wherein the flange portion of the guide bracket is configured to be coupled to the first rail.

2. The apparatus of claim 1, wherein the first engagement projection and the second engagement projection are elongate ridges that extend from an external surface of the fourth plate.

3. The apparatus of claim 1, wherein the first engagement projection and the second engagement projection are disposed adjacent to an intersection of the third plate and the fourth plate.

4. The apparatus of claim 1, wherein the second plate is disposed perpendicular to the first plate.

5. The apparatus of claim 1, wherein the fourth plate is further coupled to a fifth plate, the fifth plate disposed opposite the third plate.

6. The apparatus of claim 1, wherein the fourth plate is in parallel and offset from the second plate.

7. The apparatus of claim 1, wherein the fourth plate is perpendicular to first plate.

8. The apparatus of claim 1, wherein the first engagement projection and the second engagement projection are disposed on the fourth plate.

9. A ladder comprising the apparatus of claim 1.

10. The ladder of claim 9, wherein the ladder includes:

the first rail; and the second rail disposed parallel to and adjacent the first rail;

wherein the flange portion of the guide bracket is coupled to the first rail and the hooked portion is disposed about the first rail.

11. The ladder of claim 10, wherein the first rail has a first outer flange spaced from a first inner flange by a first rail web, and wherein the first plate of the guide bracket is coupled to the first rail web.

12. The ladder of claim 10, wherein the first rail has a second outer flange spaced from a second inner flange by a second rail web, and wherein the third plate of the guide bracket is aligned with the second rail web.

13. The ladder of claim 12, wherein the fourth plate is aligned with the second outer flange of the first rail.

14. The ladder of claim 10, wherein the ladder is an extension ladder, the first rail having a base section including a base rail and a fly section including a fly rail, the base section slidably coupled to the fly section.

15. The ladder of claim 14, wherein the guide bracket is disposed adjacent to a top end of the base section.

16. The ladder of claim 14, wherein the guide bracket is directly attached to the base section.

17. The ladder of claim 9, wherein the ladder further includes a rail shield, the rail shield including:

a first shield flange which extends perpendicularly from a shield web, the first shield flange having a first shield projection and a second shield projection forming a first shield slot therebetween; and a second shield flange spaced from the first shield flange and extending perpendicularly from the shield web, the shield web extending between the first shield flange and the second shield flange, the second shield flange including a third shield projection and a fourth shield projection that form a second shield slot therebetween.

18. The ladder of claim 17, wherein the second shield flange is parallel to the first shield flange.

19. The ladder of claim 17, wherein the first shield projection and the second shield projection extend from an outer surface of the first shield flange, and wherein the third shield projection and the fourth shield projection extend from an outer surface of the second shield flange.

20. An apparatus comprising:

a guide bracket for a ladder including a first rail and a second rail, the guide bracket including:

a flange portion including a first plate; and a hooked portion cantilevered from the flange portion by a second plate, the hooked portion formed by a third plate extending perpendicularly to a fourth plate, the hooked portion including a first engagement projection and a second engagement projection that extends from an outer surface of the fourth plate, the first engagement projection extends substantially parallel to and is spaced apart from the second engagement projection and defining a slot therebetween, wherein the flange portion of the guide bracket is configured to be coupled to the first rail.

21. The apparatus of claim 20, wherein the first rail includes a base rail and a fly rail, the flange portion of the guide bracket is configured to be coupled to the base rail and the hooked portion of the guide bracket is configured to be disposed about the fly rail when the flange portion of the guide bracket is coupled to the base rail.

* * * * *